Patented Mar. 8, 1932

1,848,610

UNITED STATES PATENT OFFICE

OSCAR ERF, OF COLUMBUS, OHIO

PROCESS OF MAKING PAPER AND PRODUCT THEREOF

No Drawing. Application filed July 8, 1929. Serial No. 376,864.

The object of this invention is to make paper and other products from green, immature and undried fibrous materials, such as corn stalks, their leaves, grasses and other fiber bearing plants. I prefer to use said fibrous materials immediately after the chlorophyll has been extracted as, for example, in the preparation of food for cattle or other animals.

The invention is embodied in the example herein set forth, the features of novelty being pointed out in the claims.

In carrying out the invention I first mix with said fibrous parts approximately a five per cent by weight aqueous solution of sulphuric acid in a closed vessel under heat, say about 270 degrees Fah. and pressure, sufficient of such solution being employed to cause a fine floating pulp. This mixture is allowed to stand for about twelve hours and is then washed in water to remove the residual acid. The mass is then chlorinated by means of chlorine or a chloride of lime to bleach it to the extent desired and to partially remove the green color or to entirely remove the green color, if the paper is to be white. The mass is then subjected to a beating action in an ordinary pulp beater with fresh water to wash out the chlorine, or bleaching agent, after which it is floated over a cloth belt to make and dry the paper in the usual way.

The advantage of this process is that it dispenses with the expense of digesting or sulphiding, the latter being necessary where matured plant fibre or wood is used in the production of paper. Further it avoids blotches in the paper due to knots or joints in matured plants. Moreover green plants are mucilaginous which promotes the cohesiveness in the fibre when made into paper by my process as described.

The proportions and procedure mentioned can be varied without departing from the gist of the invention as claimed.

What I claim is:

1. The method of making paper and the like consisting in subjecting immatured green fibrous plants from which the chlorophyll has been removed to the action of an acid, removing the free acid, and finally bleaching the mass and then pulping the same.

2. The method of making paper and the like consisting in subjecting immatured green fibrous plants from which the chlorophyll has been removed to the action of an aqueous solution of sulphuric acid, washing the mass to remove the free acid, and then bleaching and pulping the same.

3. The method of making paper and the like consisting in subjecting immatured green fibrous plants from which the chlorophyll has been removed to the action of an aqueous solution of sulphuric acid under heat and pressure, washing the mass to remove the free acid, and then bleaching and pulping the same.

OSCAR ERF.